United States Patent [19]

Baettig et al.

[11] Patent Number: 5,043,257
[45] Date of Patent: Aug. 27, 1991

[54] AZO DYES FOR PHOTOGRAPHIC SILVER DYE BLEACH MATERIAL

[75] Inventors: Kurt Baettig, Praroman; Gerald C. Jan, Villars-sur-Glane, both of Switzerland

[73] Assignee: Ilford Limited, Cheshire, United Kingdom

[21] Appl. No.: 448,005

[22] Filed: Dec. 8, 1989

[30] Foreign Application Priority Data

Dec. 12, 1988 [CH] Switzerland ................. 04583/88

[51] Int. Cl.$^5$ ............... G03C 7/29; C09B 35/029; D06P 3/60
[52] U.S. Cl. .................. 430/563; 534/591; 534/820; 534/728; 560/61; 560/62; 562/471; 562/472; 562/853; 8/681
[58] Field of Search ............. 534/591, 820; 430/563, 430/462

[56] References Cited

U.S. PATENT DOCUMENTS

| | | | |
|---|---|---|---|
| 3,506,450 | 4/1970 | Nickel et al. | 430/563 |
| 3,749,576 | 7/1973 | Piller I | 430/563 |
| 3,787,215 | 1/1974 | Piller, II | 430/563 |
| 4,118,232 | 10/1978 | Piller et al. | 534/820 X |

Primary Examiner—Mary C. Lee
Assistant Examiner—Fiona T. Powers
Attorney, Agent, or Firm—Darby & Darby

[57] ABSTRACT

Azo dyes of the formula

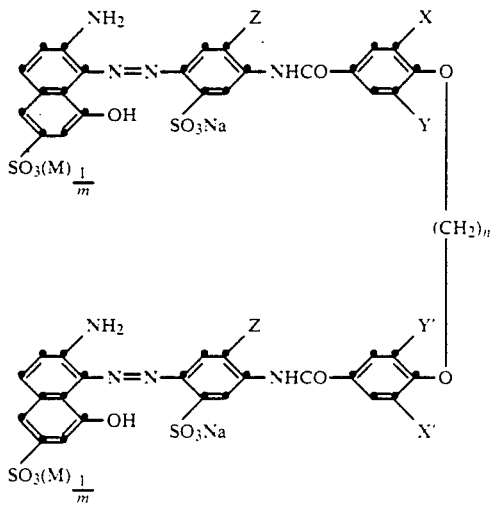

where X is alkyl or alkoxy each of 1 to 4 carbon atoms or halogen, X' is hydrogen, alkyl or alkoxy each of 1 to 4 carbon atoms or halogen, Y and Y' are independently of each other hydrogen or halogen, Z is hydrogen, alkyl or alkoxy or alkylthio each of 1 to 4 carbon atoms, or halogen. M is a 1-, 2- or 3-valent metal cation, ammonium or an organic ammonium compound. m is 1, 2 or 3 and n is 2 to 10, are suitable for use as image dyes in photographic silver dye bleach materials.

The dyes of the invention can also be used to dye textile materials.

12 Claims, No Drawings

AZO DYES FOR PHOTOGRAPHIC SILVER DYE BLEACH MATERIAL

The present invention relates to novel azo dyes, in particular magenta azo dyes, and to the use thereof as image dyes in photographic silver dye bleach materials.

Modern silver dye bleach materials are notable inter alia for very thin photographic layers where the ratio of gelatin to image dye is significantly less than in the corresponding layers of earlier materials.

However, a smaller ratio of gelatin to image dye presupposes adequate water solubility of the dye in question, since the use of organic auxiliary solvents is associated with substantial disadvantages for industrial, ecological and photographic reasons.

It has also been found that physical properties of layers deteriorate with decreasing thickness. In particular, layer adhesion is severely impaired by prior art magenta azo dyes when the ratio of gelatin to dye becomes significantly less than 15. If the wet layers are subjected to mechanical stress during processing, the layers above the layer containing the magenta azo dye then usually become detached. Similarly, the curing of the gelatin is much impaired by prior art magenta azo dyes. Evidently, the physical properties of thin layers depend to a high degree in a still to be understood manner on the structure of the image dye present therein.

It is therefore an object of the present invention to provide novel image dyes which are more soluble in aqueous systems and bring about an improvement in layer adhesion in photographic silver dye bleach materials. At the same time, however, these dyes must meet the remaining requirements expected of suitable image dyes, e.g. good resistance to diffusion, good light fastness and good bleachability, and must not have an adverse effect on the photographic properties of the material.

The present invention accordingly provides azo dyes of the formula

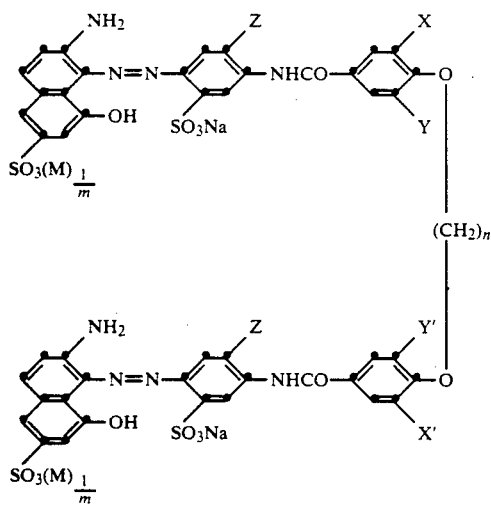

where X is alkyl or alkoxy each of 1 to 4 carbon atoms or halogen, X' is hydrogen, alkyl or alkoxy each of 1 to 4 carbon atoms or halogen, Y and Y' are independently of each other hydrogen or halogen, Z is hydrogen, alkyl or alkoxy or alkylthio each of 1 to 4 carbon atoms, or halogen, M is a 1-, 2- or 3-valent metal cation, ammonium or an organic ammonium compound, m is 1, 2 or 3 and n is 2 to 10.

The present invention also provides for the use of the azo dyes according to the invention as image dyes in photographic silver dye bleach materials, and in particular silver dye bleach materials where at least one layer which contains an azo dye according to the invention has a thickness of between 0.5 and 4.0 $\mu$m.

The present invention further provides for the use of the azo dyes of the formula (1) for dyeing textile, in particular cellulose-containing, fibre materials.

In the azo dyes of the indicated formula, X is alkyl or alkoxy each of 1 to 4 carbon atoms, e.g. methyl, ethyl, propyl, butyl, isopropyl, tert-butyl, methoxy, ethoxy, propoxy, butoxy or tert-butoxy. Furthermore, X is halogen such as fluorine, chlorine or bromine.

X' has the same meaning as X but additionally is hydrogen.

Y and Y' are independently of each other hydrogen or halogen such as fluorine, chlorine or bromine.

Z, besides hydrogen, may also be alkyl, alkoxy or alkylthio each of 1 to 4 carbon atoms, e.g. methyl, ethyl, propyl, butyl, methoxy, ethoxy, propoxy, butoxy, methylthio, ethylthio, propylthio, butylthio and the corresponding branched derivatives. Z may further be halogen, e.g. fluorine, chlorine or bromine.

M is the cation of a 1-, 2- or 3-valent metal, ammonium or an organic ammonium ion; m corresponds to the valency of M and is 1, 2 or 3.

n is a number from 2 to 10.

Preferably, X is methyl, ethyl, tert-butyl, methoxy, chlorine or bromine and X' is hydrogen, methyl, ethyl, tertbutyl, methoxy, chlorine or bromine.

Y and Y' are preferably independently of each hydrogen, chlorine or bromine.

Preferably Z is hydrogen, methyl, methoxy or methylthio.

A preferred 1-, 2- or 3-valent metal M is lithium, sodium, potassium, magnesium, calcium, barium or lanthanum.

Preferably, n is 2 to 6.

In particularly suitable azo dyes of the indicated formula, X is fluorine, chlorine, bromine, methyl, tert-butyl, methoxy or ethoxy, X' is hydrogen, fluorine, chlorine, bromine, methyl, tert-butyl, methoxy or ethoxy, Y and Y' are independently of each other hydrogen or chlorine, Z is hydrogen, M is sodium, potassium, magnesium or barium, and n is 2 to 6.

Of these azo dyes, those are preferred where X is chlorine or bromine, in particular chlorine, and X' is hydrogen, chlorine or bromine, in particular hydrogen, and also those where Y is chlorine and Y' is hydrogen.

A further group of particularly suitable azo dyes is characterized in that X and X' are chlorine, Y, Y' and Z are hydrogen, M is sodium and n is 2.

The azo dyes are notable for good resistance to diffusion, for high light fastness and for virtually complete bleach-ability. They do not impair the sensitometric properties of the material, they form stable concentrated aqueous solutions, and they are insensitive to calcium ions. They are very soluble in water or aqueous systems such as coating solutions, and they significantly improve the physical properties, in particular the adhesion, of thin layers in which they are present.

One method of preparing the azo dyes is characterized for example in that 2 moles of a compound of the formula

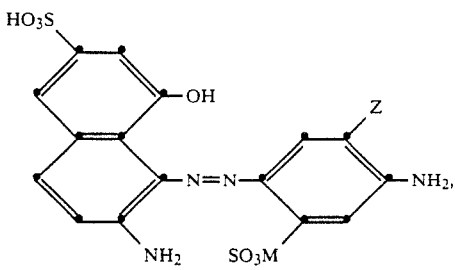

where Z and M are as defined above, are reacted with one mole of an acid chloride of the formula

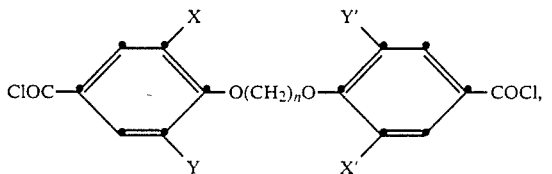

where X, X', Y, Y' and n are as defined above.

The starting compound of the formula (2) is obtained by diazotizing for example an aminonitrobenzenesulfonic acid of the formula

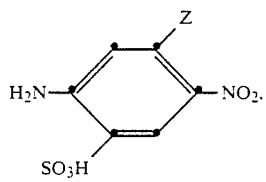

where Z is as defined above, coupling with the compound of the formula

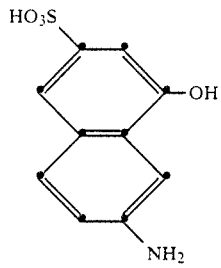

and reducing the nitro group. The compound of the formula (4) may be prepared for example as described in Published German Patent Application DE-A-2,312,728.

The compounds of the formula (3) can be prepared for example by heating a methyl 4-hydroxybenzoate derivative in the presence of a base such as potassium carbonate in a polar organic solvent, e.g. a ketone, with an alkylene dihalide in a nitrogen atmosphere.

The ester compound thus obtained is then substituted with the substituents X, X', Y and Y', and the ester groups are hydrolysed and converted into a carboxylic acid chloride group.

In photographic silver dye bleach materials according to the invention, the azo dyes of the formula (1) may be present in auxiliary layers but preferably are present in light-sensitive layers or layers adjacent thereto. The layers which contain the azo dyes as image dyes can have a very low ratio of gelatin to image dye on account of the high water solubility of the dyes. For this reason it is possible to obtain layer thicknesses of 0.5 to 4.0 μm, preferably 1.0 μm to 3.0 μm.

In the material according to the invention, the layers in question are resistant to mechanical stress to a high degree. The surprisingly good adhesion of the layers to other layers or to the support becomes noticeable in particular in the course of the processing of the exposed material, where the mechanical stress is very high, for example at the deflection rollers of the processors. While delamination problems are a constant factor with conventional materials, due to inadequate adhesion of the magenta layer to the adjacent layers, such phenomena are virtually completely unknown with the materials according to the invention.

It has also been found that textile fibre materials, in particular cellulose-containing fibre materials, are successfully dyeable in a conventional manner known per se.

The examples which follow illustrate the invention.

EXAMPLE 1

A. 15.2 g of methyl 4-hydroxybenzoate and 7.0 g of potassium carbonate are suspended in 30 ml of ethyl methyl ketone and admixed by stirring in a nitrogen atmosphere with 9.4 g of ethylene bromide added over 5 minutes. Stirring is continued at 86° C. under nitrogen for a further 36 hours. The suspension is cooled down and filtered. The filter residue is treated with hot water and filtered again. 50 ml of methanol are added to this residue, the mixture is filtered, and the filter residue is dried. 8 g of the compound of the formula

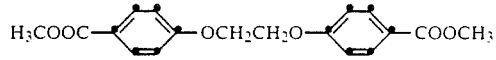

are obtained as a white powder having a melting point of 160°-161° C.

In the same manner it is possible to react for example the following alkylene dihalides with various methyl 4-hydroxybenzoates:

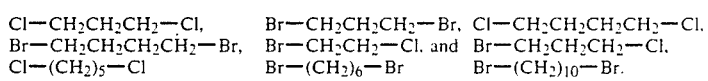

B. 33 g of the ester obtained by A. are suspended in 385 ml of acetic acid, and the suspension is heated to 100° C. 19.5 g of chlorine are gradually introduced into the suspension. The mixture is cooled down to 20° C., and the chlorinated product is isolated. The crude product is purified in methanol under reflux. 36.0 g are obtained of the compound of the formula

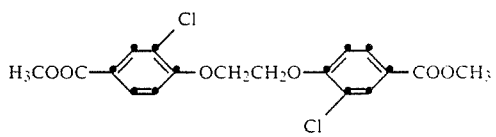

in the form of a white powder having a melting point of 190°-193° C.

C. 35.85 g of the compound of the formula

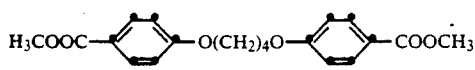

are suspended in 160 ml of acetic acid in the presence of 49.2 g of anhydrous sodium acetate. The mixture is heated to 75° C. 64 g of bromine are then added dropwise in the course of 4 hours. The suspension is stirred at 75° C. for 3 days. After the suspension has been cooled down and the crude product has been filtered off, the crude product is slurried up in water and then in methanol, the slurry is filtered, and the filter residue is dried. This gives 48 g of a compound of the formula

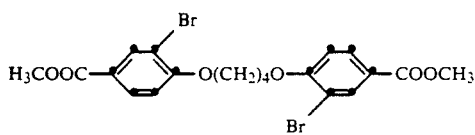

in the form of a white powder having a melting point of 163°-167° C.

By following the directions given under A, B and C it is also possible to obtain the compounds listed in the following table:

TABLE 1

| Compound | Melting point (°C.) |
|---|---|
| $CH_3OOC-C_6H_4-O(CH_2)_3O-C_6H_4-COOCH_3$ | 144–145 |
| $CH_3OOC-C_6H_4-O(CH_2)_4O-C_6H_4-COOCH_3$ | 144–146 |
| $CH_3OOC-C_6H_3(Cl)-O(CH_2)_3O-C_6H_3(Cl)-COOCH_3$ | 179–181 |
| $CH_3OOC-C_6H_4-O(CH_2)_5O-C_6H_4-COOCH_3$ | 180–182 |
| $CH_3OOC-C_6H_3(Br)-O(CH_2)_2O-C_6H_3(Br)-COOCH_3$ | 214–215 |
| $CH_3OOC-C_6H_3(Br)-O(CH_2)_4O-C_6H_3(Br)-COOCH_3$ | 163–167 |
| $CH_3OOC-C_6H_4-O(CH_2)_6O-C_6H_4-COOCH_3$ | 135–137 |
| $CH_3OOC-C_6H_2(Cl)_2-O(CH_2)_2O-C_6H_3(Cl)-COOCH_3$ | 144–147 |
| $CH_3OOC-C_6H_3(Cl)-O(CH_2)_6O-C_6H_3(Cl)-COOCH_3$ | 141–142 |
| $CH_3OOC-C_6H_3(Cl)-O(CH_2)_2O-C_6H_2(Cl)_2-COOCH_3$ | 148–149 |
| $CH_3OOC-C_6H_4-O(CH_2)_2O-C_6H_3(Cl)-COOCH_3$ | 152–154 |
| $H_3COC-C_6H_3(F)-O(CH_2)_2O-C_6H_3(F)-COCH_3$ | 170–173 |
| $CH_3OOC-C_6H_3(^tC_4H_9)-O(CH_2)_2O-C_6H_3(^tC_4H_9)-COOCH_3$ | 190–195 |
| $CH_3OOC-C_6H_3(OCH_3)-O(CH_2)_2O-C_6H_3(OCH_3)-COOCH_3$ | 184–185 |
| $CH_3OOC-C_6H_3(OCH_3)-O(CH_2)_3O-C_6H_3(OCH_3)-COOCH_3$ | 155–156 |
| $CH_3OOC-C_6H_3(OCH_3)-O(CH_2)_4O-C_6H_3(OCH_3)-COOCH_3$ | 152–155 |
| $CH_3OOC-C_6H_4-O(CH_2)_2O-C_6H_3(^tC_4H_9)-COOCH_3$ | 121–123 |
| $CH_3OOC-C_6H_3(CH_3)-O(CH_2)_2O-C_6H_3(CH_3)-COOCH_3$ | 171–173 |

D. 40 g of the compound of the formula

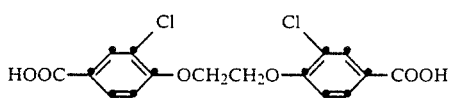

are stirred in 170 ml of 30% strength potassium hydroxide solution at 85°–90° C. for 72 hours. The mixture is poured onto 400 ml of water, the mixture is heated to the boil and, after a little bleaching earth has been added, filtered, affording after acidification with 35% strength hydrochloric acid 36 g of the compound of the formula HOOC—⌬(Cl)—OCH₂CH₂O—⌬(Cl)—COOH in the form of a white powder having a melting point of above 250° C.

The same method can also be used to prepare the compounds shown in Table 2:

TABLE 2

| Compound | Melting point (°C.) |
|---|---|
| HOOC—⌬—O(CH₂)₃O—⌬—COOH | °C. for all compounds >250° C. |
| HOOC—⌬—O(CH₂)₄O—⌬—COOH | |
| HOOC—⌬(Cl)—O(CH₂)₃O—⌬(Cl)—COOH | |
| HOOC—⌬(Cl)—O(CH₂)₄O—⌬(Cl)—COOH | |
| HOOC—⌬(Br)—O(CH₂)₂O—⌬(Br)—COOH | |
| HOOC—⌬—O(CH₂)₆O—⌬—COOH | |
| HOOC—⌬(Cl,Cl)—O(CH₂)₂O—⌬(Cl,Cl)—COOH | |
| HOOC—⌬(Cl)—O(CH₂)₆O—⌬(Cl)—COOH | |

TABLE 2-continued

| Compound | Melting point (°C.) |
|---|---|
| HOOC—⌬(Cl,Cl)—O(CH₂)₂O—⌬(Cl)—COOH | |
| HOOC—⌬(F)—O(CH₂)₂O—⌬(F)—COOH | |
| HOOC—⌬—O(CH₂)₂O—⌬(Cl)—COOH | |
| HOOC—⌬(F)—O(CH₂)₂O—⌬(F,F)—COOH | |
| HOOC—⌬(ᵗC₄H₉)—O(CH₂)₂O—⌬(ᵗC₄H₉)—COOH | |
| HOOC—⌬(OCH₃,Cl)—O(CH₂)₂O—⌬(OCH₃)—COOH | |
| HOOC—⌬(OCH₃)—O(CH₂)₃O—⌬(OCH₃)—COOH | |
| HOOC—⌬(OCH₃)—O(CH₂)₄O—⌬(OCH₃)—COOH | |
| HOOC—⌬(ᵗC₄H₉)—O(CH₂)₂O—⌬—COOH | |
| HOOC—⌬(OC₂H₅)—O(CH₂)₂O—⌬(OC₂H₅)—COOH | |
| HOOC—⌬(OCH₃,Cl)—O(CH₂)₄O—⌬(Cl,OCH₃)—COOH | |

TABLE 2-continued

| Compound | Melting point (°C.) |
|---|---|
| HOOC—⟨CH₃⟩—O(CH₂)₂O—⟨CH₃⟩—COOH | |
| HOOC—⟨OCH₃, Cl⟩—O(CH₂)₂O—⟨Cl, OCH₃⟩—COOH | |
| HOOC—⟨OC₂H₅, Cl⟩—O(CH₂)₄O—⟨H₅C₂O⟩—COOH | |

E. 11.6 g of the compound of the formula

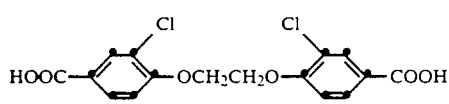

are heated in 80 ml of xylene at the boil for 4 hours in the presence of 7.0 ml of thionyl chloride and 0.5 g of N,N-dimethylformamide. A clear solution forms, which is gradually cooled down. The precipitated crystals are filtered with suction and washed with 10 ml of xylene.

This gives 11 g of the compound of the formula

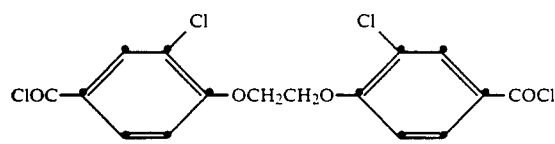

having a melting point of 177°–179° C.

The same method can also be used to prepare the compounds tabulated in Table 3.

TABLE 3

| Compound | Melting point (°C.) |
|---|---|
| ClOC—⟨Cl⟩—O(CH₂)₃O—⟨Cl⟩—COCl | 179–180 |
| ClOC—⟨Cl⟩—O(CH₂)₄O—⟨Cl⟩—COCl | * |
| ClOC—⟨Br⟩—O(CH₂)₂O—⟨Br⟩—COCl | * |
| ClOC—⟨Cl⟩—O(CH₂)₆O—⟨Cl⟩—COCl | * |
| ClOC—⟨Cl, Cl⟩—O(CH₂)₂O—⟨Cl, Cl⟩—COCl | * |
| ClOC—⟨Cl, Cl⟩—O(CH₂)₂O—⟨Cl, Cl⟩—COCl | * |
| ClOC—⟨F⟩—O(CH₂)₂O—⟨F⟩—COCl | * |
| ClOC—⟨Br⟩—O(CH₂)₄O—⟨Br⟩—COCl | * |
| ClOC—⟨Br⟩—O(CH₂)₆O—⟨Br⟩—COCl | * |
| ClOC—⟨Br⟩—O(CH₂)₃O—⟨Br⟩—COCl | * |
| ClOC—⟨⟩—O(CH₂)₂O—⟨Cl⟩—COCl | * |
| ClOC—⟨F⟩—O(CH₂)₂O—⟨F⟩—COCl | * |
| ClOC—⟨ᵗC₄H₉⟩—O(CH₂)₂O—⟨⟩—COCl | * |
| ClOC—⟨OC₂H₅⟩—O(CH₂)₂O—⟨OC₂H₅⟩—COCl | 155–156 |
| ClOC—⟨OCH₃, Cl⟩—O(CH₂)₄O—⟨Cl, OCH₃⟩—COCl | 109–110 |

TABLE 3-continued

| Compound | Melting point (°C.) |
|---|---|
| 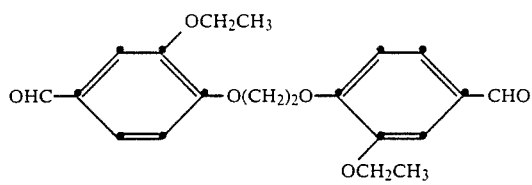 (ClOC—[CH₃-phenyl]—O(CH₂)₂O—[phenyl-CH₃]—COCl) | 174–178 * |
| (ClOC—[OCH₃, Cl-phenyl]—O(CH₂)₂O—[Cl, OCH₃-phenyl]—COCl) | 121–123 |
| (ClOC—[ᵗC₄H₉-phenyl]—O(CH₂)₂O—[phenyl-ᵗC₄H₉]—COCl) | 163–164 |
| (ClOC—[OCH₃-phenyl]—O(CH₂)₂O—[phenyl-OCH₃]—COCl) | 182–183 |
| (ClOC—[OCH₃-phenyl]—O(CH₂)₃O—[phenyl-OCH₃]—COCl) | 118–121 |
| (ClOC—[OCH₃-phenyl]—O(CH₂)₄O—[phenyl-OCH₃]—COCl) | 157–158 |

*The xylene-containing crude product is further reacted directly (without purification).

F. 11 g of the compound of the formula

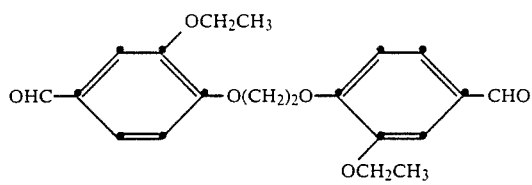

are initially introduced in 200 ml of butanone, and the mixture is heated to 50° C. and admixed with a solution of 10.7 g of sulfamic acid in 60 ml of water. A solution of 10.4 g of sodium chlorite in 40 ml of water is gradually added dropwise to this mixture. The mixture is subsequently stirred at 60° C. for one hour and then cooled down to 5° C., and the precipitate obtained is filtered off. 10 g are obtained of the compound of the formula

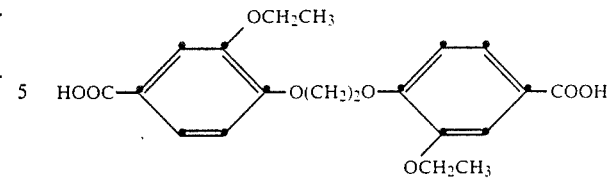

having a melting point above 250° C.

G. 16.7 g of the compound of the formula

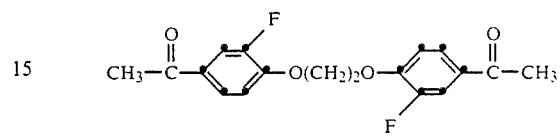

are dissolved in 400 ml of dioxane. To this solution is added dropwise at 10°–20° C. a freshly prepared hypobromite solution prepared from 250 ml of 4N sodium hydroxide solution and 15.4 ml of bromine. After one hour at 60° C. the mixture is cooled down to 20° C., and the precipitate is filtered off. The precipitate is heated to 80° with 150 m [sic] of 1:1 ethanol/water and adjusted to pH 2 with concentrated hydrochloric acid. The mixture is cooled down to 20° C., and the precipitate is filtered and dried. 14 g are obtained of a compound of the formula

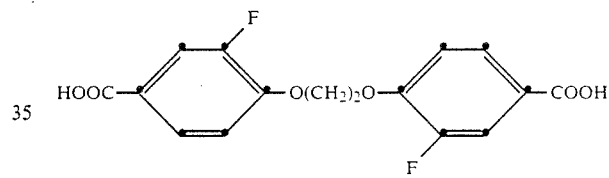

having a melting point of above 250° C.

H. 10.3 g of the aminoazo dye of the formula

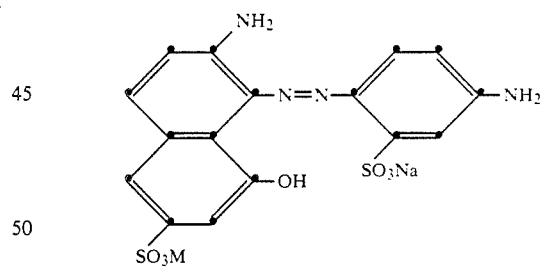

are initially introduced in 90 ml of N-methylpyrrolidone. 10 ml of solvent are distilled off. 3.5 ml of pyridine are added. The suspension is stirred at 25° C., and a suspension of 4.2 g of the acid chloride of the formula

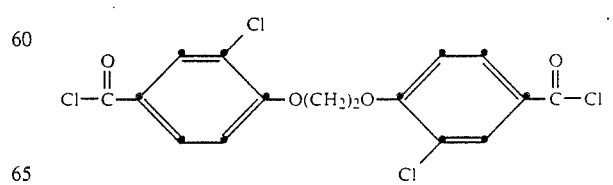

dissolved in 40.0 g of N-methylpyrrolidone is added over 60 minutes. The reaction mixture is stirred for 2 hours and then heated to 60° C. It is diluted with 10 ml of water and filtered. The filtrate is clear, and a solution of 6 g of sodium acetate in 60 ml of methanol is added to it dropwise at 60° C. The precipitated dye is filtered off.

The crude dye is dissolved in N-methylpyrrolidone at 60° C. and precipitated with methanol/sodium acetate. The precipitate is filtered off, washed with methanol and dried. The dye is obtained of the formula

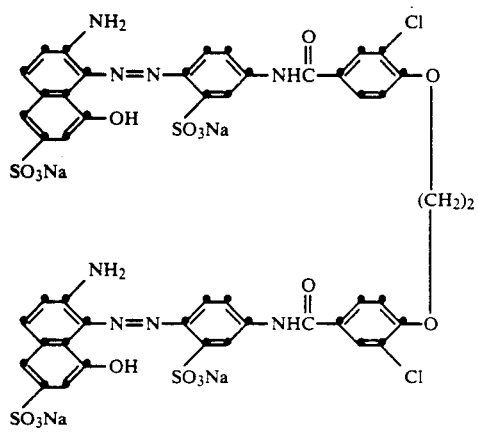

By the same manner it is possible to obtain the dyes tabulated in Table 4.

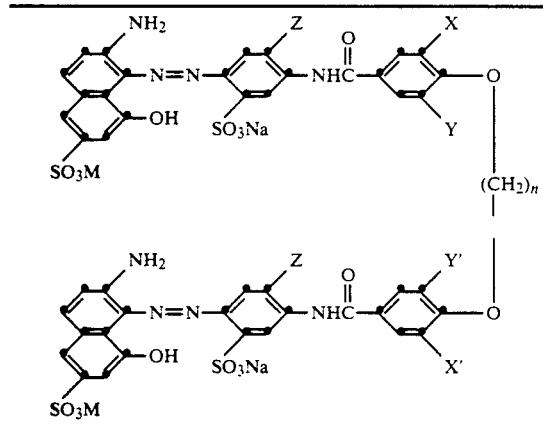

| Nr. | n | X | X' | Y | Y' | Z | M | $\lambda_{max}$* | $\lambda_{max}$** |
|---|---|---|---|---|---|---|---|---|---|
| I | 2 | Cl | Cl | H | H | H | Na | 539/<u>570</u> | 520 |
| II | 3 | Cl | Cl | H | H | H | Na | 530 | 520 |
| III | 4 | Cl | Cl | H | H | H | Na | 538/<u>571</u> | 519 |
| IV | 6 | Cl | Cl | H | H | H | Na | 573 | 518 |
| V | 2 | Br | Br | H | H | H | Na | 541/<u>572</u> | 521 |
| VI | 2 | Cl | Cl | H | H | H | K | 539/<u>571</u> | 521 |
| VII | 4 | Br | Br | H | H | H | Na | 538/<u>569</u> | 519 |
| VIII | 2 | F | F | H | H | H | Na | 539/<u>571</u> | 520 |
| IX | 2 | Cl | H | H | H | H | Na | 572 | 520 |
| X | 3 | OCH$_3$ | OCH$_3$ | H | H | H | Na | <u>531</u>/565 | 518 |
| XI | 2 | OCH$_3$ | OCH$_3$ | H | H | H | Na | 570 | 521 |
| XII | 2 | $^t$C$_4$H$_9$ | H | H | H | H | Na | 535/<u>565</u> | 520 |
| XIII | 2 | $^t$C$_4$H$_9$ | $^t$C$_4$H$_9$ | H | H | H | Na | 533 | 520 |
| XIV | 4 | OCH$_3$ | OCH$_3$ | H | H | H | Na | 568 | 518 |
| XV | 2 | OC$_2$H$_5$ | OC$_2$H$_5$ | H | H | H | Na | 567 | 518 |
| XVI | 2 | CH$_3$ | CH$_3$ | H | H | H | Na | 535/<u>569</u> | 520 |
| XVII | 2 | OCH$_3$ | OCH$_3$ | Cl | Cl | H | Na | 569 | 520 |
| XVIII | 4 | OCH$_3$ | OCH$_3$ | Cl | Cl | H | Na | 519 | 519 |
| XIX | 2 | Cl | Cl | Cl | Cl | H | K | 573 | 521 |
| XX | 2 | Cl | H | H | H | H | Na | 536/<u>569</u> | 521 |
| XXI | 2 | Cl | H | Cl | H | H | Na | 572 | 521 |
| XXII | 2 | Cl | Cl | Cl | H | H | Na | 572 | 521 |

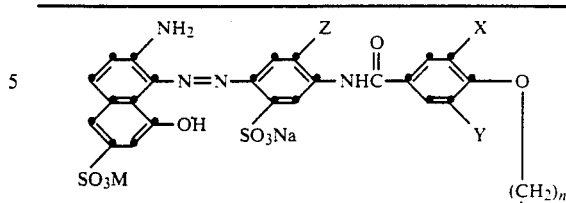

| Nr. | n | X | X' | Y | Y' | Z | M | $\lambda_{max}$* | $\lambda_{max}$** |
|---|---|---|---|---|---|---|---|---|---|
| XXIII | 2 | OC$_2$H$_5$ | OC$_2$H$_5$ | H | H | H | Mg | 567 | 518 |
| XXIV | 2 | OC$_2$H$_5$ | OC$_2$H$_5$ | H | H | H | Ba | 566 | 518 |
| XXV | 2 | Cl | Cl | H | H | CH$_3$ | Na | 526 | 516 |

*measured in gelatin, underlined value corresponds to the position of the main peak
**measured in 1:1 DMF/H$_2$O

EXAMPLE 2

The solubilities of the compounds according to the invention were determined as follows:

An excess of dye was heated at 50° C. in water for one hour. The mixture was then cooled down to 20° C. and filtered, and the dye content of the clear solution was determined spectroscopically. The results obtained are shown in Table 5.

TABLE 5

| Dye No. | n | X | X' | Y | Y' | M | % solubility |
|---|---|---|---|---|---|---|---|
| Ia | 2 | H | H | H | H | Na | 1.8 |
| I | 2 | Cl | Cl | H | H | Na | 5.1 |
| VI | 2 | Cl | Cl | H | H | K | 4.1 |
| XVI | 2 | CH$_3$ | CH$_3$ | H | H | Na | 2.8 |
| V | 2 | Br | Br | H | H | Na | 4.8 |
| IIa | 3 | H | H | H | H | Na | 1.8 |
| X | 3 | CH$_3$O— | CH$_3$O— | H | H | Na | 4.4 |
| IIIa | 4 | H | H | H | H | Na | <0.1 |
| III | 4 | Cl | Cl | H | H | Na | 1.2 |
| VII | 4 | Br | Br | H | H | Na | 1.0 |
| XIV | 4 | —OCH$_3$ | —OCH$_3$ | H | H | Na | 1.7 |

The dyes of the formulae (Ia), (IIa) and (IIIa) are known from Published German Patent Application DE-A-2,216,620.

The results in Table 5 show the significantly higher solubility of the azo dyes according to the invention compared with similar azo dyes of the prior art.

EXAMPLE 3

3.3 ml of 6% strength gelatin solution, 2.0 ml of 1% strength aqueous solution of the gelatin curing agent 2,4-dichloro-6-hydroxytriazine (potassium salt), 1.0 ml of 1% strength aqueous solution of the dye of the formula according to the invention

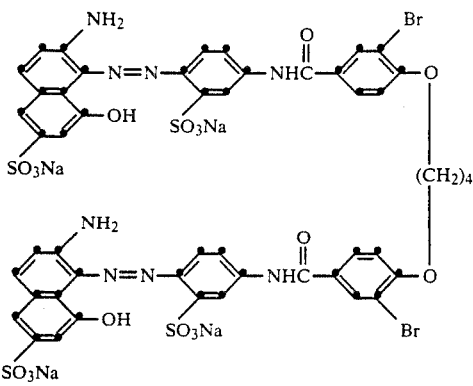

and 3.3 ml of silver bromide emulsion containing 35 g of silver per kg are pipetted into a test tube and made up with deionized water to 10.0 ml. This solution is vigorously mixed and maintained in a water bath at 40° C. for 5 minutes.

The mixture is poured onto an opaque triacetate support (size 13×18 cm) and dried. The light-sensitive material thus obtained is exposed under a step wedge and processed as follows at 24° C.

| | |
|---|---|
| Development | 1 minute |
| Silver and dye bleach | 1 minute |
| Fixing | 1 minute |
| Watering | 1 minute |
| Drying | |
| The developer bath has the following composition per liter of solution: | |
| Sodium sulfite | 50 g |
| 1-Phenyl-3-pyrazolidone | 0.2 g |
| Hydroquinone | 6 g |
| Sodium carbonate | 35 g |
| Potassium bromide | 4 g |
| Benzotriazole | 0.3 g |

The silver dye bleach bath has the following composition per liter of solution:

| | |
|---|---|
| Concentrated sulfuric acid | 28 ml |
| Sodium iodide | 9 g |
| 4-Nitrophenol-2-sulfonic acid (disodium salt) | 6 g |
| 6-Methoxy-2,3-dimethyl- | 1 g |

| -continued | |
|---|---|
| quinoxaline | |
| Bis(2-cyanoethyl)-2-sulfo-ethylphosphine (sodium salt) | 3 g |
| The fixing bath contains per liter of solution: | |
| Sodium thiosulfate | 200 g |
| Sodium metabisulfite | 20 g |

A brilliant light-fast magenta wedge is obtained, which has been bleached completely white in the areas of the originally highest silver density.

Very similar results are obtained on using one of the other dyes of Table 4.

EXAMPLE 4

A photographic material is prepared for the silver dye bleach process. To this end, the following layers are applied to a polyethylene-coated paper support:

A red-sensitive layer containing 1.8 g of gelatin, 0.29 g of silver as a silver bromoiodide emulsion of 2.6 mol % of iodide and 135 mg of the cyan image dye of formula (100)

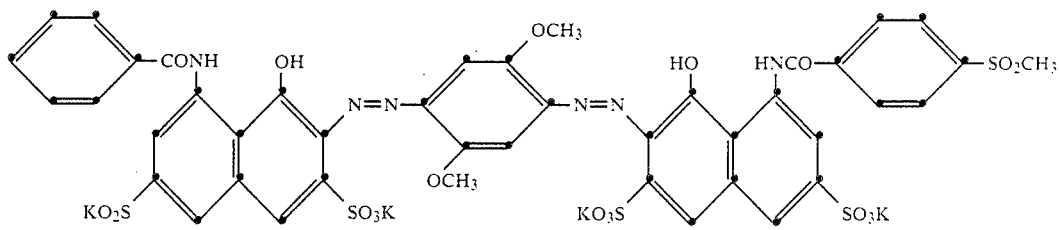

per m², a gelatin intermediate layer of 1.2 g.m⁻² of gelatin, a green-sensitive layer containing 1.4 g of gelatin, 0.32 g of silver as a silver bromoiodide emulsion with 2.6 mol % of iodide and 190 mg of magenta image dye of the formula (I)

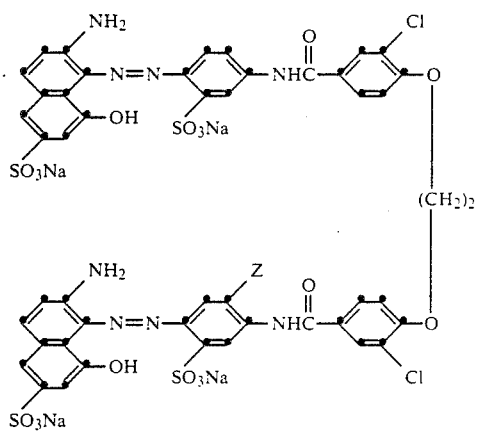

per m², a filter yellow layer of 1.2 g.m⁻² of gelatin, 0.04 g.m⁻² of colloidal silver and 0.04 g.m⁻² of the yellow dye of the formula (102)

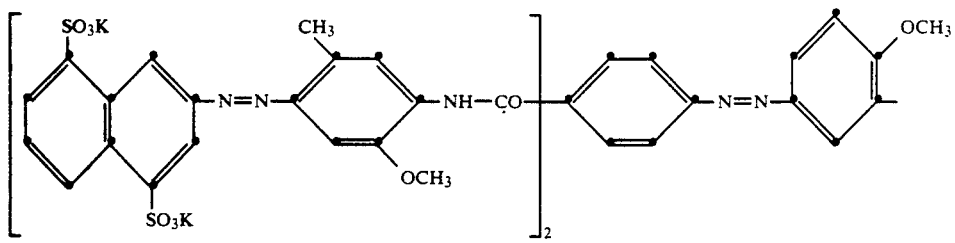

a blue-sensitive layer containing 0.9 g of gelatin, 0.23 g of silver as a silver bromoiodide emulsion with 2.6 mol % of iodide and 90 mg of the yellow dye of the formula (102) per m², and a gelatin protective layer of 0.8 g.m⁻² of gelatin. The material also contains 0.08 g of the gelatin curing agent 2,4-dichloro-6-hydroxytriazine (potassium salt). This is material A.

A material B is prepared in the same manner, except that the place of the dye of the formula (I) is taken by a comparative dye of the formula

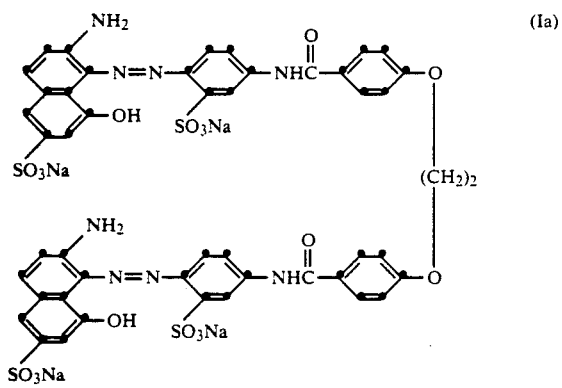

(Ia)

The two materials are subjected to the wet scratch resistance test, which provides a measure of the adhesion of the layers:
Material B: 182 cN
Material A: 390 cN Material B shows distinct signs of delamination, while material A shows at 390 cN scratches right through to the support without any delamination. This illustrates the comparatively high adhesion of the dye layer according to the invention to the layers surrounding it. The scratch resistance of the layers in the above-described material was determined according to the following directions.

To test the scratch resistance or adhesion of the cast photographic layers, the following layer system was prepared:

A subbed polyethylene-coated paper support was coated in succession with casting solutions 1 and 2:

Coating solution 1: 250 g of a 5% strength gelatin solution in water are admixed in succession with 100 g each of a 1% strength dye solution of the compounds under test (Table 6) and 20 ml of an 8% strength solution of wetting agent Nekal Bx, followed by 25 g of a light-sensitive silver bromide emulsion (silver content 5.5%).

Coating solution 2: 375 g of a 5% strength gelatin solution are admixed with 25 ml of an 8% strength Nekal solution, 55 ml of 1.25% strength solution of the gelatin curing agent 2,4-dichloro-6-hydroxytriazine (potassium salt) and 45 ml of water.

The result is a two-layered photographic material in which the bottom dye-containing layer has a dry thickness of 3 μm and the top layer has a dry layer of 1.5 μm. The coated material is dried at a temperature of 43° C. and relative humidity of 60% for 15 hours. It is then subjected to the wet scratch resistance test.

The wet scratch resistance is determined with an instrument purpose-built for this measurement. It consists essentially of a row of 10 tips equipped with a spherical diamond (1.15 mm). The tips are drawn across the layers to be tested, the pressure being increased incrementally in eight stages. Between the individual stages, the tips are raised each time. Prior to the measurement, the layers are swollen for 4 minutes in a borax/NaOH buffer of pH 10.0. The scratch resistance is expressed in cN (centiNewton) units and corresponds to the force at which 50 of the scratches show clear evidence of damage to the integrity of the layer. The average of three measurements is reported. The reliability of the method is checked by the simultaneous measurement of layers of known hardness.

Table 6 below summarizes the results of further measurements.

TABLE 6

| Dye N | n | X | X' | y | y' | Wet scratch resistance cN |
|---|---|---|---|---|---|---|
| (Ia) | 2 | H | H | H | H | 268 |
| (I) | 2 | Cl | Cl | H | H | 522 |
| (XIV) | 2 | CH₃ | CH₃ | H | H | 320 |
| (V) | 2 | Br | Br | H | H | 382 |
| (IIa) | 3 | H | H | H | H | 156 |
| (II) | 3 | Cl | Cl | H | H | 407 |
| (X) | 3 | —OCH₃ | —OCH₃ | H | H | 524 |
| (IIIa) | 4 | H | H | H | H | 52 |
| (III) | 4 | Cl | Cl | H | H | 275 |
| (VII) | 4 | Br | Br | H | H | 263 |
| (XIV) | 4 | —OCH₃ | —OCH₃ | H | H | 221 |

The dyes of the formulae (Ia), (IIa) and (IIIa) are known from Published German Patent Application DE-A-2,216,620.

The comparison in Table 6 shows that layers which contain azo dyes according to the invention show significantly higher scratch resistance or adhesion to other layers than the corresponding layer which contain similar known dyes.

We claim:
1. A photographic element containing photographic silver dye bleach materials comprising an azo dye of the formula

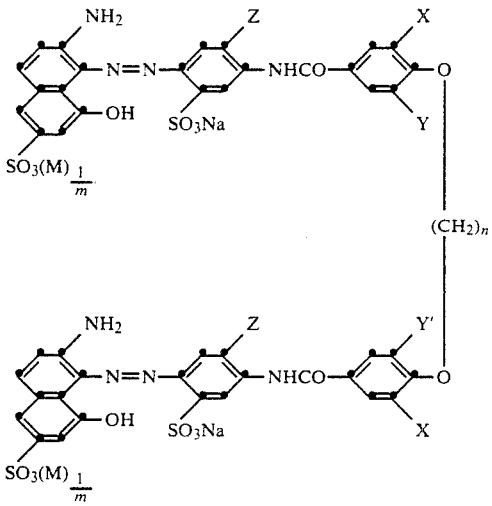

where X is alkyl or alkoxy each of 1 to 4 carbon atoms or halogen, X' is hydrogen, alkyl or alkoxy each of 1 to 4 carbon atoms or halogen, Y and Y' are independently of each other hydrogen or halogen, Z is hydrogen, alkyl or alkoxy or alkylthio each of 1 to 4 carbon atoms, or halogen, M is a 1-, 2- or 3-valent metal cation or ammonium, m is 1, 2 or 3 and n is 2 to 10, said azo dye functioning as an image dye in said photographic silver dye bleach materials.

2. The photographic element of claim 1, wherein X and X' are —CH$_3$.

3. The photographic element of claim 2, wherein Y and Y' are hydrogen.

4. The photographic element of claim 1, wherein X and X' are —OCH$_3$.

5. The photographic element of claim 4, wherein Y and Y' are hydrogen.

6. The photographic element of claim 1, wherein at least one of X and X' is halogen.

7. The photographic element of claim 6, wherein Y and Y' are hydrogen.

8. The photographic element of claim 1 wherein X and X' are halogen.

9. The photographic element of claim 8 wherein Y and Y' are hydrogen.

10. The photographic element of claim 1 wherein said photographic silver dye bleach material comprises at least one layer containing an azo dye of claim 1.

11. The photographic element of claim 10 wherein said layer has a thickness of between 0.5 and 4.0 meters.

12. A photographic element containing photographic silver dye bleach materials and comprising
    a photographic support layer,
    a plurality of layers on said photographic support layer,
    at least one of said layers comprising an azo image dye of the formula

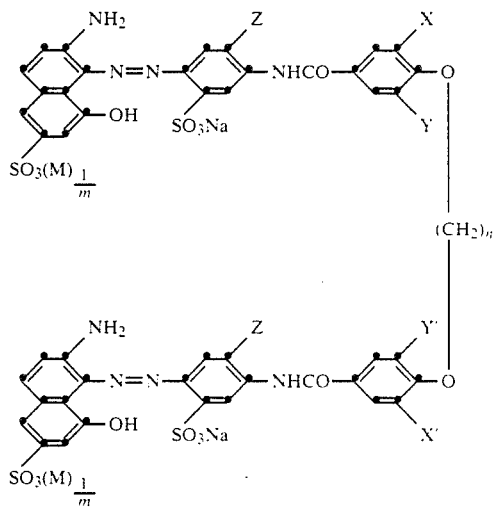

where X is alkyl or alkoxy each of 1 to 4 carbon atoms or halogen, X' is hydrogen, alkyl or alkoxy each of 1 to 4 carbon atoms or halogen, Y and Y' are independently of each other hydrogen or halogen, Z is hydrogen, alkyl or alkoxy or alkylthio each of 1 to 4 carbon atoms, or halogen, M is a 1-, 2- or 3-valent metal cation or ammonium, m is 1, 2 or 3 and n is 2 to 10, and said azo image dye containing layer having high scratch resistance.

* * * * *